July 21, 1959
R. E. JONES
2,896,063
ELECTRIC ARC WELDING METHOD
Filed April 25, 1956
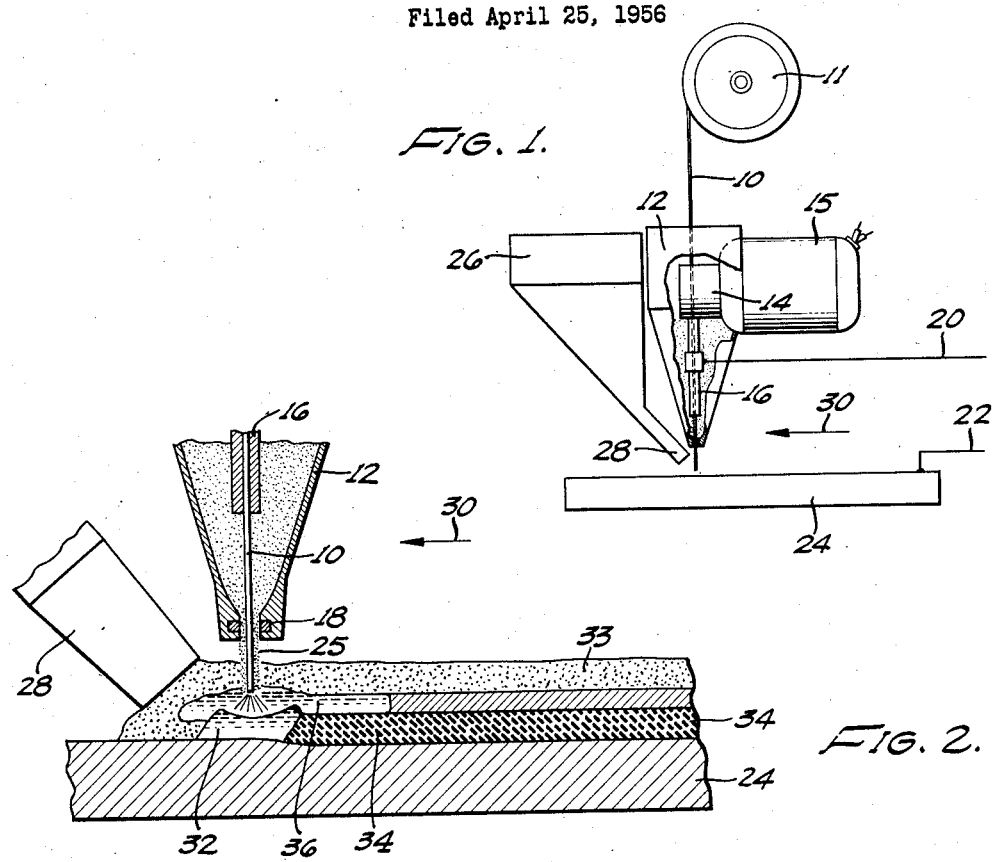
FIG. 1.
FIG. 2.
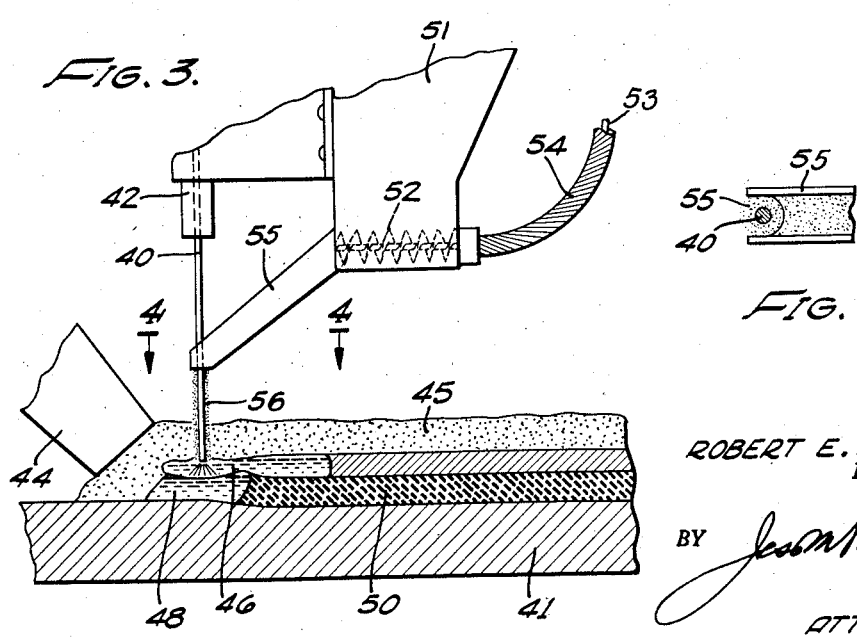
FIG. 3.
FIG. 4.
ROBERT E. JONES
INVENTOR.
BY *Jesse M. Roberts*
ATTORNEY

United States Patent Office 2,896,063
Patented July 21, 1959

2,896,063
ELECTRIC ARC WELDING METHOD

Robert E. Jones, La Canada, Calif., assignor to Western Carbide Corporation, North Hollywood, Calif., a corporation of California Application April 25, 1956, Serial No. 580,558

3 Claims. (Cl. 219—73)

This invention relates to electric arc welding procedures and is directed especially to the deposition of metal on workpieces by arc welding techniques for hardfacing and other purposes.

One object of the invention is to attain both versatility and economy in carrying out hardfacing procedures and light procedures by means of an electric arc. This object is attained by providing a portion of the material of the hardfacing deposit in the form of a welding rod and providing the remaining portion in the form of magnetically responsive powder. The magnetically responsive welding powder is positioned contiguous to the welding rod to be attracted to the surface of the welding rod by the magnetic field when the welding rod is energized for the creation of the arc. The adhering magnetically responsive particles of the welding particle are continually attracted to the advancing welding rod and are carried by the welding rod to the arc to join with the metal of the welding rod in forming the desired deposit.

Versatility lies in the fact that the composition of the hardfacing deposit may be varied simply by varying the ingredients of the welding powder and/or by varying the diameter of the welding rod, thereby to vary the ratio of the metal of the powder to the metal of the welding rod. Economy resides in the fact that there is no need to use special welding rods and no need to stock a large variety of welding rods for the deposition of a wide variety of hardfacing compositions.

A primary object of the invention is to achieve superiority in the hardfacing composition both with respect to its configuration and with respect to its physical properties. This purpose is accomplished by covering the surface of the workpiece with a layer of a granulated fusible flux that is substantially free of substances capable of evolving large amounts of gas at welding temperatures. The electric arc is created inside this flux layer and the heat of the arc melts the flux to form a molten blanket that keeps the atmosphere away from the arc and away from the newly deposited metal. The result is a deposit of metal that is bright and smooth surfaced.

With reference to the physical properties of the deposit, an important advantage of the molten flux blanket is that it desirably retards the rate of cooling of the deposited metal. The slow cooling is especially desirable when the formation of carbides is involved, since it increases the size of the carbide particles. The various objects, features and advantages of the invention may be understood from the following description considered with the accompanying drawing.

In the drawing, which is to be regarded as merely illustrative:

Fig. 1 is a simplified, diagrammatic view in side elevation of an apparatus in the process of carrying out the method of the present invention, the flux layer on the workpiece being omitted for clarity of illustration;

Fig. 2 is a greatly enlarged fragment of Fig. 1 showing the flux layer on the workpiece;

Fig. 3 is a view similar to Fig. 2 illustrating a second form of apparatus that may be used in carrying out the method of the invention; and Fig. 4 is a fragmentary, secondary view taken as indicated by the line 4—4 of Fig. 3.

The drawing shows, by way of example, an apparatus and an arrangement of the apparatus that may be employed to carry out the method of the invention. The welding rod that serves as the electrode for forming the electric arc may be in the form of a long welding wire 10 that is unwound from a spool or reel 11 as needed. The welding wire is directed downward into and through a welding powder hopper 12. Inside the hopper, the welding rod passes through a feeding mechanism 14 which mechanically engages the welding rod and advances the welding rod through the hopper under automatic control in a well known manner. The feeding mechanism 14 is actuated by a suitable motor 15. From the feeding mechanism 14, the welding rod passes through a guide sleeve 16 inside the hopper, this guide sleeve terminating short of the bottom or discharge end of the hopper to expose a portion of the welding rod inside the hopper. The hopper 12 contains a supply of the magnetically responsive welding powder and the described arrangement causes the welding powder to surround the welding rod as the welding rod approaches the exit or bottom discharge end of the hopper. As shown in Fig. 2, a pair of permanent magnets 18 are positioned on opposite sides of the bottom discharge port of the hopper 12 to serve as means to prevent the magnetically responsive welding powder from dropping out of the hopper by gravity.

The welding circuit includes an electrode cable 20 and a ground cable 22, the electrode cable being connected to the guide sleeve 16 inside the hopper and the ground cable being connected to the workpiece 24 on which the metal deposit is to be made. It is apparent that this arrangement creates a circuit which includes the welding rod 10 below the guide sleeve 16, and it is further apparent that the electrically energized welding rod 10 just below the guide sleeve will magnetically attract the magnetically responsive powder. Thus, as shown in Fig. 2, the welding rod 10 emerging from the bottom of the hopper 12, carries a sheath or coating 25 of the magnetically responsive welding powder.

Adjacent the hopper 12 for the magnetically responsive welding powder is a hopper 26 that contains the granular flux material that is to be used to form the molten protective blanket on the surface of the workpiece 24. The hopper 26 has a discharge spout 28 that is positioned to deposit the flux material on the workpiece 24 in advance of the arc. Thus, in Figs. 1 and 2, where the movement of the apparatus relative to the workpiece is indicated by the arrows 30, it is apparent that the granular flux material will be deposited by the spout 28 ahead of the arc.

Fig. 2 shows how the arc forms a pool 32 of molten metal on the workpiece 24. The metal forming this pool comprises metal from the welding rod 10 and metal from the magnetically responsive powder. In addition, an adjacent portion of the metal of the workpiece 24 melts to join the pool. The metal of the pool 32 cools to form the desired hardfacing deposit 34.

Fig. 2 shows how the granular flux material from the spout 28 is deposited in advance of the arc to form a deep layer 33. The heat produced by the arc causes a portion of this granular material in the region of the arc to form a molten protective blanket 36 in which the arc is submerged. This molten blanket eventually cools to form a solid, fused layer which may be readily removed from the cooled hardfacing layer 34. It is apparent that the deposit of the layer 33 of granular material on the workpiece in advance of the arc not only results in protection of the welding zone and the deposited metal from the atmosphere, but also slows down the cooling rate of the deposited hardfacing metal forming the layer 34. An important advantage of the retarded cooling rate is that it favors the formation of relatively large secondary carbide crystals in the hardfacing layer.

In a typical practice of the invention using the above described apparatus, I may employ a magnetically responsive welding powder that is produced by a mixture of material in parts by weight, as follows:

*Formula A*

363 parts of high carbon ferrochrome (70% chromium, 25% iron and 5% carbon), —30 mesh
91 parts of magnetite ($Fe_3O_4$), —150+250 mesh
10 parts of silica ($SiO_2$), —200 mesh
25 parts of ferrosilicon (50% silicon), —40 mesh These constituents are intimately intermixed by tumbling. Fifteen parts by weight of potassium silicate of specific gravity 1.21 is then added and the mixture is thoroughly tumbled to cause the potassium silicate to dampen all of the particles. After drying at 250° F., the material is broken up into clusters of particles in a suitable mill, and, when passed through a 40-mesh screen, the composition is ready for use.

The relatively fine magnetite and silica are dispersed among and bonded to the larger particles of ferrochrome and ferrosilicon. The ferrochrome not only provides chrome for the hardfacing weld metal, but also contributes iron and carbon to the weld metal. The silica, which may be omitted if desired, serves as a fluxing agent in the arc welding procedure, and the ferrosilicon not only serves as a deoxidizer or reducing agent, but also lowers the melting point of the weld metal, and, in addition, is an alloy metal. The potassium silicate not only serves as a binder or cementing agent, but also stabilizes the arc. In addition, the silicate is helpful for slag formation.

The ferrochrome may be replaced by any suitable alloying material including other ferroalloys, such as ferromolybdenum, ferrotungsten, ferrovanadium, or the like. The ferrochrome may also be replaced at least in part by pure metals, such as chromium, molybdenum, tungsten, vanadium, titanium and manganese, as well as ores of such metals.

Substitutes for the silica include boric acid, potassium pentaborate, aluminum oxide, fluorspar, and feldspar.

The ferrosilicon may be replaced at least in part by ferromanganese, silicon metal, calcium silicon, nickel silicon, ferroboron, and the like.

Substitutes that may be used in place of the potassium silicate include sodium silicate, ethyl orthosilicate, gum arabic, gum tragacanth, ethyl cellulose dissolved in acetone and toluene, and various other adhesive materials.

The essential ingredients, of course, are the alloy metal, the magnetite, and the binder or cementing agent, but the other ingredients are added to serve the stated purposes. The proportions may be varied, but, in general, the magnetite should comprise from 10 to 25% of the total weight of the product.

Where it is desirable to avoid excessive splatter in the welding operation, 4 parts of calcium fluoride may be added. Other alkaline fluorides may be substituted, including fluorides of potassium, sodium and lithium, as well as ammonium fluoride. Such an addition results in the release of gaseous fluoride compounds which fluxes the chromic oxide to reduce splatter. If the calcium fluoride is added, however, it is desirable also to add 4 parts of calcium carbonate or other alkaline carbonate to combine with the volatile fluorine compounds that would otherwise objectionably escape into the atmosphere.

In another practice of the invention, using the above described apparatus, I may produce the welding powder by employing a mixture of materials by weight, as follows:

*Formula B*

25 lbs. high carbon ferrochrome (7% or more carbon), —30 mesh
1 lb. 8 ozs. ferromolybdenum (60% molybdenum), —30 mesh
1 lb. 4 ozs. ferromanganese (75% manganese, 6% carbon), —30 mesh
3 lbs. 12 ozs. ferrosilicon (50% silicon), —30 mesh
3 lbs. 12 ozs. magnetite ($Fe_3O_4$), —150 mesh
4 ozs. calcium fluoride —100 mesh
4 ozs. calcium carbonate —100 mesh
1 oz. ethyl cellulose These ingredients are mixed dry, for example, by tumbling, to distribute the ethyl cellulose among the other ingredients. After this mixing operation, 600 cc. of ethyl acetate is added and the ingredients are again mixed, preferably by tumbling, for ten minutes.

The solvent, ethyl acetate, combines with the ethyl cellulose to form an adhesive composition with the result that all of the particles are given a gummy coat. The mixture is then spread out for air drying to evaporate the solvent. The major portion of the resulting product is of the desired degree of fineness. It is desirable, however, to break up the final product in a suitable mill and to pass it through a 30-mesh screen.

The molybdenum increases the yield strength of the deposited metal. The manganese contributes to the hardness and abrasive character of a deposited metal, and, in addition, acts as a deoxidizing agent and a desulfurizing agent.

The ethyl cellulose is a cellulose ether made by the reaction of ethyl chloride with alkali cellulose as expressed by the type reaction:

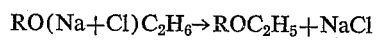

$$RO(Na+Cl)C_2H_6 \rightarrow ROC_2H_5 + NaCl$$

where R represents the cellulose radical.

The commercial product available under the tradename Hercules Ethyl Cellulose N-type has a substitution value between 2.42 and 2.53 ephoxyl groups per anhydroglucose unit, or 43 to 50% ethoxyl content. Preferably, the ethyl cellulose has a viscosity of 50 cps. at 5% concentration by weight at 25° C.

Instead of ethyl acetate, other solvents may be used, including butyl acetate, toluene-acetone mixtures, methanol, ethanol, ethylene dichloride, etc.

The use of an organic adhesive instead of the alkaline silica solution has several advantages. One of the more important advantages is that the use of ethyl cellulose in the manner described eliminates the necessity for the drying operation at 250° F. No heat application whatsoever is required. Another important advantage is that the final mixture of fine particles is not hygroscopic. In addition, the mixture is stable in the presence of light, heat, water, and salt solutions. The coating on the particles is exceptionally tough.

Any well known granular flux material used for conventional submerged arc welding may be employed to form the molten blanket on the workpiece. For example, the granular flux material may comprise granular mill slag, such as is produced by steel refining processes, the slag having less than .05% of phosphorus and less than .05% of sulfur.

One limitation of the previously described apparatus shown in Figs. 1 and 2 is that if the powder is too highly magnetically responsive, the permanent magnets 18 cause the powder in the hopper 12 to form a flow-blocking bridge at the hopper outlet. If magnetite is used, as stated above in Formulas A and B, this difficulty does not arise. In some instances, however, it is desirable to use powdered iron instead of magnetite, with consequent substantial increase in the magnetic responsiveness of the powder. The second apparatus, shown in Figs. 3 and 4, is advantageous in that it may be used with welding powder of even the highest degree of magnetic responsiveness.

In Fig. 3, the welding rod 40 is connected to the welding circuit in the usual manner, the workpiece 41 being grounded in the same circuit. The welding rod is fed automatically in the usual manner through a guide sleeve 42 to continuously sustain the arc. The spout 44 of a flux hopper dispenses granular flux material to form a deep layer 45, as heretofore described, and a portion of this granular material is heated to form the molten protective blanket 46. The arc is submerged in this protective blanket and forms a molten metal pool 48 which solidifies to form the hardfacing layer 50.

The highly magnetically responsive powder is supplied by a hopper 51 which is provided at its lower end with an automatic metering feed device comprising a small screw conveyer 52 actuated by a flexible shaft 53 in a flexible sheath 54. The magnetic powder dispensed by the feeding mechanism gravitates down an inclined chute 55 to the region immediately adjacent the electrically charged welding rod 40. The highly magnetically responsive powder delivered by the chute forms a coating or sheath 56 around the advancing wire.

This second form of the apparatus may be used advantageously with magnetically responsive welding power produced by the following three formulas:

Formula C 363 parts of high carbon ferrochrome (70% chromium, 25% iron and 5% carbon), −30 mesh
120 parts of powdered cast iron −100 mesh
10 parts of silica ($SiO_2$), −200 mesh
25 parts of ferrosilicon (50% silicon), −40 mesh

Formula D 25 lbs. high carbon ferrochrome (7% or more carbon), −30 mesh
1 lb. 8 ozs. ferromolybdenum (60% molybdenum), −30 mesh
1 lb. 4 ozs. ferromanganese (75% manganese, 6% carbon), −30 mesh
3 lbs. 12 ozs. ferrosilicon (50% silicon), −30 mesh
10 lbs. powdered cast iron −100 mesh
4 ozs. calcium fluoride −100 mesh
4 ozs. calcium carbonate −100 mesh
1 oz. ethyl cellulose

Formula E 50 lbs. high carbon ferrochrome (70% chrome, 7% carbon), −30 mesh
50 lbs. powdered cast iron −100 mesh
½ lb. ethyl cellulose These ingredients are mixed dry, for example, by tumbling, to distribute the ethyl cellulose and then sufficient ethyl acetate is added to dampen the mixture. Approximately 1800 cc. of the ethyl acetate may be used. The ingredients are again mixed, for example, by tumbling, and then the mixture is spread out for air drying. When all the solvent is evaporated, the mixture may be milled to pass through a 30-mesh screen.

I claim as my invention:

1. A method of applying to a metal workpiece a metal layer of a composition having a magnetic content and a nonmagnetic alloy metal content, characterized by the steps of: placing at least a part of the length of a welding rod in an electric circuit for deposition of the metal of the rod on the workpiece by an electric arc, said welding rod comprising a portion of the content of said composition, less than all of the magnetic content, and less than all of the nonmagnetic alloy content; finely dividing the remaining nonmagnetic alloy content to form particles; finely dividing the remaining magnetic content to form particles; bonding the nonmagnetic alloy particles and the magnetic particles together to form magnetically responsive clusters of particles; placing on said workpiece a layer of granulated, fusible flux material substantially free of substances capable of evolving large amounts of gas at welding temperatures; creating an arc between the welding rod and the workpiece inside said layer; placing a quantity of said magnetically responsive clusters adjacent said current-carrying part of the welding rod to cause the clusters to adhere magnetically to the welding rod; and feeding said welding rod with the adhering clusters thereon to the arc inside said flux layer.

2. A method of applying to a metal workpiece a metal layer of a composition having a magnetic content and a nonmagnetic alloy metal content, characterized by the steps of: placing at least a part of the length of a welding rod in an electric circuit for deposition of the metal of the rod on the workpiece by an electric arc, said welding rod comprising a portion of the content of said composition, less than all of the magnetic content, and less than all of the nonmagnetic alloy content; finely dividing the remaining nonmagnetic alloy content to form particles; finely dividing the remaining magnetic content to form particles; bonding the nonmagnetic alloy particles and the magnetic particles together to form magnetically responsive clusters of particles; placing on said workpiece a layer of granulated, fusible flux material substantially free of substances capable of evolving large amounts of gas at welding temperatures; creating an arc between the welding rod and the workpiece inside said layer; forming said magnetically responsive clusters into a stream converging onto said part of the length of the welding rod to cause the clusters of the stream to adhere magnetically to the welding rod; and feeding said welding rod with the adhereing clusters thereon to the arc inside said flux layer.

3. A method as set forth in claim 2, which includes the step of metering the flow of said stream in accord with the rate of feed of said welding rod to cause a predetermined quantity of magnetically responsive clusters to adhere to the welding rod per unit length of the welding rod.

References Cited in the file of this patent

UNITED STATES PATENTS

| | | |
|---|---|---|
| 2,211,424 | Holslag | Aug. 13, 1940 |
| 2,326,865 | Kennedy | Aug. 17, 1943 |
| 2,767,302 | Brashear | Oct. 16, 1956 |
| 2,810,063 | Brashear | Oct. 15, 1957 |

FOREIGN PATENTS

| | | |
|---|---|---|
| 608,270 | Great Britain | Sept. 13, 1948 |